United States Patent [19]

Wallbank

[11] 4,305,676
[45] Dec. 15, 1981

[54] ANTI-FRICTION PAD FOR BALL AND SOCKET COUPLINGS

[76] Inventor: Ronald M. Wallbank, P.O. Box 501, Rockaway, Oreg. 97136

[21] Appl. No.: 80,320

[22] Filed: Oct. 1, 1979

[51] Int. Cl.³ ............................................. F16C 11/06
[52] U.S. Cl. ..................................... 403/130; 280/511
[58] Field of Search ............... 403/128, 129, 130, 135, 403/140, 132, ; 280/511, 512, 513

[56] References Cited

U.S. PATENT DOCUMENTS

| | | | |
|---|---|---|---|
| 1,889,297 | 11/1932 | Russell | 280/511 |
| 2,727,768 | 12/1955 | Latzen | 403/129 |
| 2,854,829 | 10/1958 | Porter | 403/135 X |
| 2,917,334 | 12/1959 | Baker | 403/140 |
| 2,932,534 | 4/1960 | Williams | 403/140 |
| 3,094,376 | 6/1963 | Thomas | 403/140 X |
| 3,216,753 | 11/1965 | Oishei | 403/128 |
| 3,679,234 | 7/1972 | Colliau | 403/130 X |
| 3,731,957 | 5/1973 | Uchida | 403/130 |
| 3,968,981 | 7/1976 | Saurez | 280/511 |
| 4,060,331 | 11/1977 | Domer | 403/130 |
| 4,203,683 | 5/1980 | Rogers | 403/132 |

*Primary Examiner*—Andrew V. Kundrat
*Attorney, Agent, or Firm*—Oliver D. Olson

[57] ABSTRACT

A bore extends radially inward from the top side of the ball component of a ball and socket trailer hitch coupling and removably receives the stem projecting from the underside of a thin pad of plastic material having a low coefficient of friction, whereby when the socket component is coupled to the ball the pad is interposed between their confronting surfaces. The pad may be formed as a hollow segment of a sphere approximately matching the radius of the ball, or it may be flat but sufficiently flexible to be bent to conform to the spherical surface of the ball when the ball and socket components are coupled together.

6 Claims, 4 Drawing Figures

ANTI-FRICTION PAD FOR BALL AND SOCKET COUPLINGS

BACKGROUND OF THE INVENTION

This invention relates to ball and socket couplings, and more particularly to an anti-friction pad to be interposed between the ball and socket components to a trailer hitch coupling to reduce the friction between them.

Ball and socket couplings in general require periodic lubrication in order to maintain effective operation and to minimize wear, to achieve maximum operating life. This requires vigilant monitoring of the coupling to insure the presence of adequate lubrication of all times. Moreover, when the coupling is disconnected, the lubricant is exposed, presenting an unsightly appearance and rendering likely the accidental contact by and contamination of the skin and clothing of nearby persons.

Applicant is unaware of any substitute heretofore provided or suggested for such lubricant.

SUMMARY OF THE INVENTION

In its basic concept, this invention provides an anti-friction pad for interposition between the components of a ball and socket coupling for minimizing the friction therebetween.

It is by virtue of the foregoing basic concept that the principal objective of this invention is achieved; namely, to overcome the aforementioned limitations and disadvantages associated with the use of lubricants between the components of ball and socket couplings.

Another object of this invention is to provide an anti-friction pad of the class described which is provided with means by which to insure its retention between the components of a ball and socket coupling.

Still another object of this invention is the provision of an anti-friction pad of the class described which is adaptable for use with ball and socket couplings of various sizes.

A further object of this invention is the provision of an anti-friction pad of the class described which is of simplified and inexpensive construction.

The foregoing and other objects and advantages of this invention will appear from the following detailed description, taken in connection with the accompanying drawing of preferred embodiments.

DESCRIPTION OF THE PREFERRED EMBODIMENT

Figure 1:
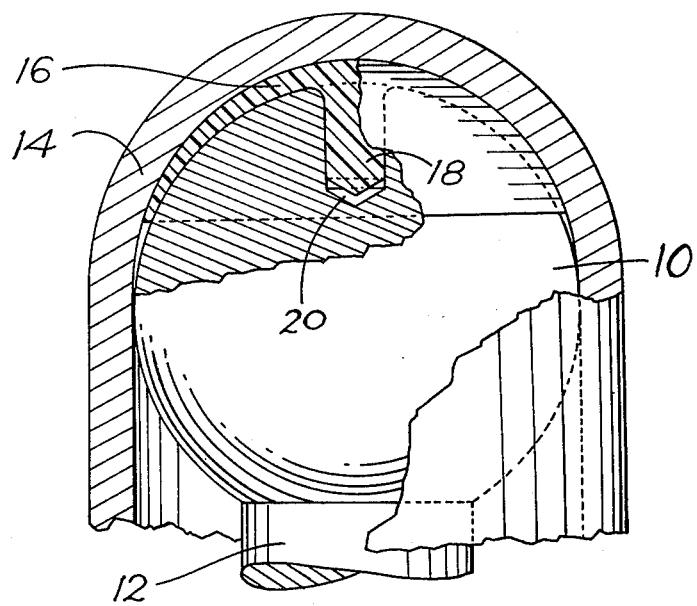
FIG. 1 is a fragmentary vertical elevation of the ball and socket components of a typical form of trailer hitch coupling, incorporating therewith an anti-friction pad embodying the features of this invention, parts being broken away to disclose internal structural details.

For purposes merely of illustration, FIG. 1 shows an anti-friction pad of this invention in association with a typical form of ball and socket trailer hitch coupling. It is to be understood that the anti-friction pad of this invention may be utilized with diverse forms of ball and socket couplings.

In FIG. 1 the ball component 10 of a trailer hitch coupling is shown secured to the top end of a post 12 the lower end of which would be secured to a mounting projecting rearwardly of the rear end of a vehicle (not shown). FIG. 1 also shows the portion of the socket component 14 of the coupling which releasably overlies the ball component. The socket component conventionally is attached to the forward end of the tongue of a trailer (not shown).

In accordance with this invention, an anti-friction pad is provided as a substitute for lubricant conventionally interposed between the ball and socket components, to minimize friction and thereby maximize the operating life of the coupling.

Figure 2:
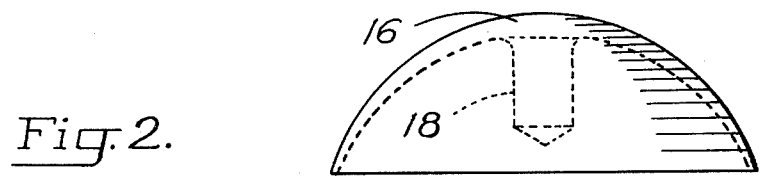
FIG. 2 is a vertical elevation of the anti-friction pad shown in FIG. 1.
Figure 3:
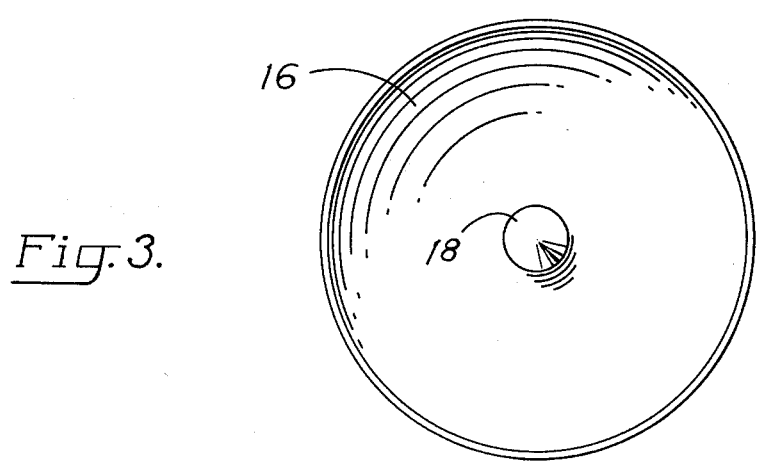
FIG. 3 is a bottom view of the anti-friction pad shown in FIG. 2.

In the embodiment illustrated in FIGS. 1, 2 and 3 of the drawing, the anti-friction pad 16 is formed in the shape of a hollow segment of a sphere. Although the radii of the inner and outer surfaces of the sphere may vary over a considerable range, they preferably are approximately equal to the radius of the ball component.

Further, and as best shown in FIGS. 1 and 2, the pad 16 decreases in cross sectional thickness circumferentially outward to the edge of the segment. Still further, it is to be noted from FIG. 1 that the spherical segment is less than a hemisphere, since the internal diameter of the socket component 14 is substantially the same as the diameter of the ball component 10. By limiting the spherical segment of the pad to less than a hemisphere, the close tolerance between the ball and socket components is preserved, without binding.

The anti-friction pad described may be maintained in operative position between the upper portion of the ball and the confronting, overlying portion of the socket, by virtue of the close tolerance between the ball and socket components. However, it is preferred that the maintenance of this operative position be insured by the provision of an anchor stem 18 which projects centrally inward from the underside of the pad for removable reception within a bore 20 provided in the top portion of the ball component 10. This anchoring stem allows the pad to be provided in the form of a hollow spherical segment of various sizes and radii.

Figure 4:
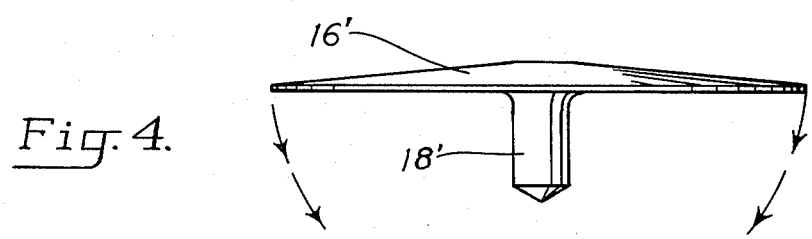
FIG. 4 is a vertical elevation of a second form of anti-friction pad embodying the features of this invention.

Indeed, FIG. 4 of the drawing illustrates the pad 16' to a substantially flat round plate which decreases in thickness progressively from its axial center to its circumference. The stem 18' projects centrally inward from the underside of the plate.

The pad of FIG. 4 is made of a material of low coefficient of friction and also of sufficient flexibility that it will become bent to form the hollow spherical segment illustrated in FIG. 1, upon the application of downward force exerted by the socket component 14 when the ball and socket components are coupled together.

As previously mentioned, the anti-friction pad is made of a material having a low coefficient of friction, whereby to substitute for conventionally used lubricants. There are many synthetic thermoplastic resins, such as Teflon, Delrin and others, that are suitable for this purpose.

Referring again to FIG. 1 of the drawing, it is to be observed that the anti-friction pad 16 serves by its interposition between the upper portion of the ball component 10 and the confronting surface of the socket component 14, to provide minimum friction between the ball and socket components. The pad thus effectively provides the function of a conventional lubricant while avoiding the limitations and disadvantages accompanying the use of conventional lubricants, as discussed in detail hereinbefore.

It will be recognized that the anti-friction pad illustrated and described may be produced by conventional plastic molding techniques, in large volume at extremely low cost. Accordingly, the pad may be replaced when worn, at minimum expense.

It will be apparent to those skilled in the art that various changes may be made in the structural details described hereinbefore without departing from the spirit of this invention.

Having now described my invention and the manner in which it may be used, I claim:

1. In combination with a ball and socket coupling, an anti-friction pad forming a segment of a hollow sphere and being comprising:
   (a) a pad of material having a low coefficient of friction interposed removably between the upper spherical portion of the ball and the overlying portion of the socket,
   (b) the pad extending downward over less than the upper half of the spherical ball and being tapered in section so as to have a maximum outer transverse cross sectional dimension no greater than the diameter of the ball.

2. The combination of claim 1 wherein the pad tapers to reduced thickness uniformly outward from its center to its periphery.

3. The combination of claim 1 including a stem projecting centrally from the underside of the pad for removable insertion into a bore extending inward from the upper side of the spherical ball.

4. The combination of claim 1 wherein the inner and outer surfaces of the hollow segment has a radius approximating the radius of the ball.

5. The combination of claim 1 including a stem projecting centrally from the underside of the pad for removable insertion into a bore extending inward from the upper side of the spherical ball.

6. The combination of claim 1 wherein the pad is initially substantially flat and is made of flexible material, and a stem projects centrally from the underside of the pad for removable insertion into a bore extending inward from the upper side of the spherical ball.

* * * * *

UNITED STATES PATENT AND TRADEMARK OFFICE
CERTIFICATE OF CORRECTION

PATENT NO. : 4,305,676
DATED : 15 December 1981
INVENTOR(S) : Ronald M. Wallbank It is certified that error appears in the above-identified patent and that said Letters Patent are hereby corrected as shown below:

Column 3, lines 19 and 20, "anti-friction pad forming a segment of a hollow sphere and being comprising:"

should read: --anti-friction pad comprising:--;

Column 3, line 21, "a pad of material" should read -- a pad forming a segment of hollow sphere and being of material--.

Column 4, line 14, "has a radius" should read: --have radii--;

Column 4, line 15, "the ball" should read --the spherical ball--.

Signed and Sealed this

Twenty-third Day of February 1982

[SEAL]

Attest:

Attesting Officer

GERALD J. MOSSINGHOFF

*Commissioner of Patents and Trademarks*